United States Patent [19]
Wolf

[11] Patent Number: 6,163,551
[45] Date of Patent: Dec. 19, 2000

[54] NETWORK ELEMENT FOR USE IN SYNCHRONOUS DIGITAL COMMUNICATIONS SYSTEM AND CENTRAL CLOCK GENERATOR

[75] Inventor: Michael Wolf, Mundelsheim, Germany

[73] Assignee: Alcatel, Paris, France

[21] Appl. No.: 08/994,529

[22] Filed: Dec. 19, 1997

[30] Foreign Application Priority Data

Dec. 20, 1996 [DE] Germany ............................ 196 53 261

[51] Int. Cl.$^7$ ....................................................... H04J 3/06
[52] U.S. Cl. ........................... 370/503; 370/507; 370/516
[58] Field of Search .................................... 370/503, 507, 370/516; 375/356, 362

[56] References Cited

U.S. PATENT DOCUMENTS

| | | | |
|---|---|---|---|
| 5,251,239 | 10/1993 | Turban et al. | 375/114 |
| 5,822,383 | 10/1998 | Muntz et al. | 375/362 |
| 5,886,996 | 3/1999 | Wolf | 370/507 |
| 5,896,427 | 4/1999 | Muntz et al. | 375/372 |
| 6,058,101 | 5/2000 | Huang et al. | 370/208 |

FOREIGN PATENT DOCUMENTS

| | | |
|---|---|---|
| 0262705 | 4/1988 | European Pat. Off. . |
| 0435395 | 7/1991 | European Pat. Off. . |
| 0660554 | 6/1995 | European Pat. Off. . |
| 4012762 | 10/1991 | Germany . |
| 4238899 | 5/1994 | Germany . |
| 4122276 | 2/1995 | Germany . |
| 4395760 | 10/1995 | Germany . |
| 4395761 | 10/1995 | Germany . |
| 4446511 | 6/1996 | Germany . |
| 19515344 | 8/1996 | Germany . |
| 9207433 | 4/1992 | WIPO . |

OTHER PUBLICATIONS

"Synchronization Strategy and Phase Noise Performance in Networks including SDH Transmission Equipment", M. Wolf, *8th European Frequency and Time Forum*, Mar. 9–11, 1994, Weihenstephan, Germany, pp. 166–175.

"Network Node Interface for the Synchronous Digital Hierarchy", *ITU–T G.707*, (Mar. 1996).

Architecture of Transport Networks Based on the Synchronous Digital Hierarchy (SDH), *ITU–T Recommendation G.803*, (Jun. 1997).

"Timing Requirements at the Outputs of Primary Reference Clocks Suitable for Plesiochronous Operation of International Digital Links", *ITU–T Recommendation G.811*, 1988.

"Timing Requirements at the Outputs of Slave Clocks Suitable for Plesichronous Operation of International Digital Links", *ITU–T Recommendation G.812*, 1988.

"Timing Characteristics of SDH Equipment Slave Clocks (SEC)", *ITU–T Recommendation G.813*, (Aug. 1996).

"Lower Layer Protocol Profiles for the Q3 Interface" *ITU–T Recommendation Q,811* (Mar. 1993).

"Upper Layer Protocol Profiles for the Q3 Interface" *ITU–T Recommendation Q.812*, (Mar. 1993).

*Primary Examiner*—Chi H. Pham
*Assistant Examiner*—Brenda H. Pham

[57] ABSTRACT

The network elements NE1, . . . , NE6 of a synchronous digital communications system must be synchronized with each other without the possibility of clock loops occurring. A network node NODE contains network elements NE1, . . . , NE6 and a central clock generator SASE. The network elements transmit clock signals 2M to the clock generator, which contain a clock of a message signal STM-N and a quality indicator (SSM) contained in the message signal which reflects the accuracy of the clock. The clock generator selects one of the clock signals 2M as the reference clock REF and informs the control installation STE which of the clock signals it has selected and the degree of accuracy of this clock signal. On the basis of this message STAT the control installation gives instructions ANW to the network elements with respect to the quality indicator which the network elements are to transmit to their outputs.

4 Claims, 4 Drawing Sheets

NETWORK ELEMENT FOR USE IN SYNCHRONOUS DIGITAL COMMUNICATIONS SYSTEM AND CENTRAL CLOCK GENERATOR

BACKGROUND OF THE INVENTION

1. Technical Field

The invention concerns a synchronous digital communications system, a control installation for a network node of a synchronous digital communications system, a network element and a central clock generator for a network node of a synchronous digital communications system.

2. Discussion of Related Art

A synchronous digital communications system is for example an SDH (Synchronous Digital Hierarchy) system or an SONET (Synchronous Optical Network) system. When messages are transmitted via such a communications system, it is essentially necessary that all the network elements (e.g. Add/Drop-Multiplexer, Crossconnects or Line Multiplexer) operate synchronously with each other. ITU recommendation G.803 also states that a network node containing several network elements must be supplied with a reference clock by a single central clock generator of the network node.

A conference article by Dr. M. Wolf, 8th. European Frequency and Time Forum 9., Nov. 3, 1994, TU Munich, pages 166 to 174, describes how the synchronization of the network elements can take place in such a synchronous digital communications system: One network element receives message signals at two inputs, from which a clock is derived and can be used for the synchronization. The accuracy of the clocks in these message signals is provided by a contained quality indicator, hereafter called SSM (Synchronization Status Message, see e.g. ITU-T recommendations G.707, G.708 or G.709). By means of the SSM a selection device in the network element selects one of the clocks as the reference clock and routes it to a central clock generator of the network node. This central clock generator distributes the reference clock to all the network elements of the network node. It also describes that the central clock generator can be an independent unit, or that the clock generator of a network element, preferably that of a crossconnect, can be used as a central clock generator. To prevent the formation of synchronization loops, i.e. where two network elements use each other as mutual reference clock sources, an additional SSM is defined: "Do Not Use for synchronization", hereafter called DNU. It is transmitted from a network element to all the outputs that are connected to the network element which was selected as the reference clock source.

One problem which is linked to the represented solution is that the network elements of the network node do not know the origin of the selected reference clock, or its accuracy. Nor can the central clock generator provide this information because the clock is selected by the selection device of a network element. As the accuracy of their reference clock, the network elements can only indicate in the SSM the accuracy of the central clock generator during open unsynchronized operation, which as a rule corresponds to the accuracy established in the ITU-T G.812. Also, the SSM DNU cannot be transmitted to the outputs which are connected to the reference clock source used for the synchronization, since this reference clock source is not known to the network elements. This can lead to the formation of synchronization loops.

SUMMARY OF INVENTION

The object of the invention is to provide a synchronous digital communications system whereby the transmission of a quality indicator (SSM) is made possible as a function of the accuracy of the reference clock source used in the network node. Another object of the invention is to indicate a control installation for a network node of such a communications system. Further objects of the invention are to indicate a network element and a central clock generator for such a communications system.

The object regarding the communications system is fulfilled, according to a first aspect of the invention, by at least one network node, which contains the network elements, and a central clock generator, and with at least one control installation wherein the network elements are connected to the central clock generator for receiving a reference clock from the central clock generator, the central clock generator is connected to at least a part of the network elements for receiving a total of at least two clock signals, each containing a clock and a quality indicator that is indicative of accuracy of the clock, the central clock generator is connected to the control installation for sending messages about its synchronization status to the control installation, and where the control installation is connected to the network elements for sending instructions to the network elements, where the instructions include quality indicators for transmission by the network elements.

Regarding the control installation for a network node of a synchronous digital communications system containing several network elements and a central clock, according to a second aspect of the invention, comprises means for receiving a message about a synchronization status of the central clock generator and means for transmitting instructions to the network elements, where the instructions include quality indicators to be transmitted by the network elements, and which are used to select an external reference clock for network elements that do not belong to the network node.

Regarding the network element with a clock provider which can be tuned to a reference clock, a reference clock input that is connected to the clock provider for receiving the reference clock, and a number of connector units for receiving and sending message signals, where a clock derivation circuit is assigned to at least a part of the connector units, for deriving a clock from the message signal received by the pertinent connector unit, according to a third aspect of the present invention, is characterized by clock signal outputs respectively assigned to one of the connector units with a clock derivation circuit, for sending clock signals containing the clock of the message signal received by the pertinent connector unit, and a quality indicator which is indicative of the accuracy of this clock, and an input for receiving instructions, where the instructions include quality indicators to be transmitted by the network element to the individual connector units.

Regarding the central clock generator for a network node of a synchronous digital communications system, with a clock provider which can be tuned to an external clock, and a reference clock output from which a reference clock can be obtained for network elements of the network node, such is characterized, according to the invention, by a number of clock signal inputs for receiving clock signals, each of which contains a clock and a quality indicator indicative of the accuracy of the clock, a selector unit for selecting the external clock for tuning the clock provider by means of the quality indicators, and an output for sending a message about the synchronization status of the central clock generator to a control installation.

An advantage of the invention is that the formation of synchronization loops is prevented by a synchronous digital communications system according to the invention.

BRIEF DESCRIPTION OF THE DRAWING

Embodiments of the invention are explained in the following by means of FIGS. 1 to 4, where.

DETAILED DESCRIPTION OF PREFERRED EMBODIMENTS

Network elements in a synchronous digital communications system operate synchronously with each other by tuning their own clock generators to a clock derived from a received message signal. Since network elements receive message signals at several inputs, a selection is made from the several received message signals as to which clock is to be used to tune the internal clock provider i.e. which clock is used as the reference clock. The selection makes use of a quality indicator sent with each message signal, for example as established in the ITU-T recommendation G.707. This quality indicator reflects the accuracy of the clock of the respective message signal and is called SSM (Synchronization Status Message) in the following.

In accordance with the invention the selection of a reference clock is made in a central clock generator, whose object is to provide a central reference clock to all the network elements of a network node. Another important point of the invention is that the central clock generator sends a message about its synchronization status to a control installation. The message contains information regarding the accuracy of the clock selected as the reference clock and the origin of this clock. The control installation in turn sends instructions to all the network elements of the network node regarding which quality indicator they are to transmit from which output.

Figure 1:
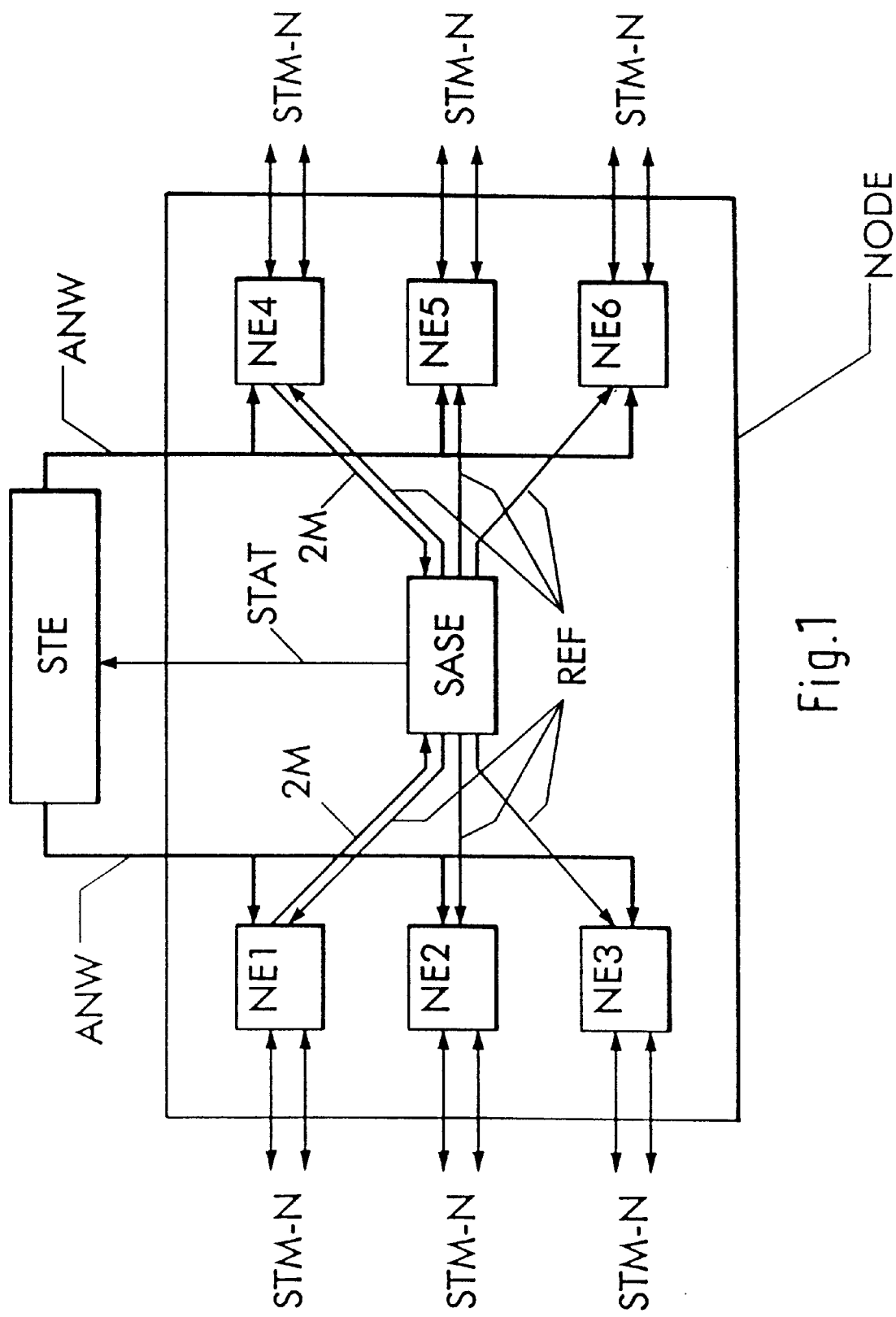
FIG. 1 is a control installation and a network node comprising several network elements and a central clock generator.

In a first embodiment illustrated in FIG. 1, a synchronous digital communications system contains a network node NODE and a control installation STE. The network node NODE contains six network elements NE1, . . . , NE6, which are connected via a transmission medium to other not illustrated network elements of the synchronous digital communications system, and receive and send message signals STM-N. This is indicated in FIG. 1 by two double arrows for each network element. However this does not mean that the six network elements NE1, . . . , NE6 are each connected to two other network elements, but indicates that each of the six network elements NE1, . . . , NE6 receives message signals from one or from several of the other not illustrated network elements, and transmits to them.

The six network elements NE1, . . . , NE6 are connected to a central clock generator SASE and from it receive a reference clock REF to which each network element NE1, . . . , NE6 tunes its own clock generator. In this way the network elements NE1, . . . , NE6 work synchronously with each other. In this embodiment, the central clock generator SASE in turn is connected to clock signal outputs of two of the network elements NE1, NE4 and receives clock signals 2M from them. Such a clock signal 2M contains a clock which was derived by the transmitting network element NE1, NE4 from a received message signal STM-N, and also a quality indicator which reflects the accuracy of the clock contained in the message signal STM-N.

The clock signal in the first embodiment is a signal with a transmission rate of 2 MBit/s, and the clock has a pulse frequency rate of 2 MHz which is derived from a message signal STM-N of the synchronous digital hierarchy (SDH). The clock signal transmits the quality indicator (SSM) which is contained in the framework of the received message signal STM-N in accordance with ITU-T recommendation G.707.

The central clock generator SASE selects one of the clock signals by means of the quality indicators, derives a clock from the selected clock signal 2M and uses it to tune its internal clock provider. This internal clock provider represents the reference clock source of the network node NODE and the reference clock for the network elements NE1, . . . , NE6 is obtained from it. In the event of a disturbance e.g. the breakdown of particular message signals from which the clock signals are derived, the clock provider of the central clock generator continues to function in the open unsynchronized operation and continues to produce a reference clock REF for the network node NODE. The accuracy of the reference clock in the open unsynchronized operation then corresponds to the accuracy of the clock provider, which in the embodiment is the accuracy established in the ITU-T G.812.

The control installation STE in the first embodiment is connected to the central clock generator SASE and from it receives a message STAT about its synchronization status. The content of this message is the accuracy of the selected clock according to the pertinent SSM and the origin of the clock, i.e. from which network element the selected clock signal is received and which of the clock signal inputs has the available clock signal. The first embodiment uses an X.25 interface for the connection between the central clock generator SASE and the control installation STE.

The message STAT is always sent by the central clock generator SASE when it selects another clock signal for adjusting its clock provider, for example due to a breakdown of the selected clock signal. The time when this message is sent to the control installation is not critical, because a change in the accuracy of the reference clock REF only affects the synchronous digital communications system after a relatively long time span of several hours or days. This is due to the specified high accuracy of the received clocks and the high accuracy of the clock provider in the open unsynchronized operation, which is established for example for the SDH in the ITU-T recommendations G.811, G.812 and G.813. One effect on the synchronous digital communications system could be an increase in the slip rate for example.

The control installation STE has a connection to the individual network elements NE1, . . . , NE6 via which it sends instructions ANW to the network elements NE, . . . , NE6. This is indicated in FIG. 1 by a heavier line, which does not mean however that it is a parallel connection via which all the network elements receive the same instruction, but that each network element receives one or several of their own instructions. This information can be transmitted via the existing Q-interfaces of the network management, which are established in the ITU-T recommendations Q.811 and Q.812. The instructions ANW concern the SSM which the network elements NE1, . . . , NE6 transmit from their individual outputs with the message signals STM-N they send from these outputs.

Figure 2:
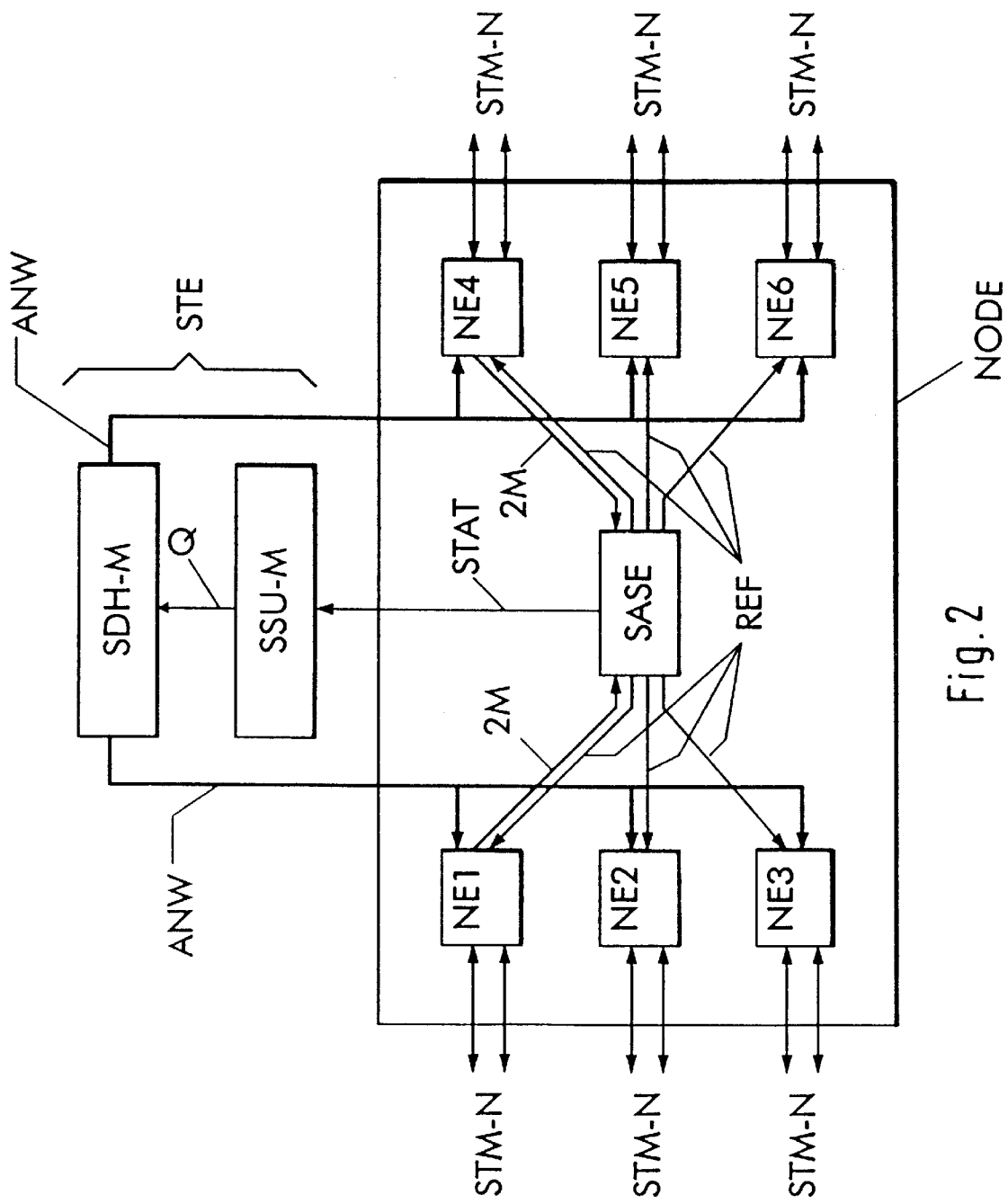
FIG. 2 is the network node in FIG. 1 and a two-part control installation.

FIG. 2 illustrates a second embodiment for a control installation STE. The illustrated network node NODE is the same network node NODE as in FIG. 1. The control installation STE in this second embodiment comprises two separate units: a first control unit SSU-M which is connected to the central clock generator SASE, and a second control unit SDH-M which is connected to the network elements NE1, ..., NE6. A transmission medium Q connects the two control units to each other. This is advantageously a Q-interface. The first control unit SSU-M is a unit for controlling and monitoring a number of central clock generators of different network nodes. The second control unit is used for controlling and monitoring network elements of the synchronous digital communications system.

Figure 3:
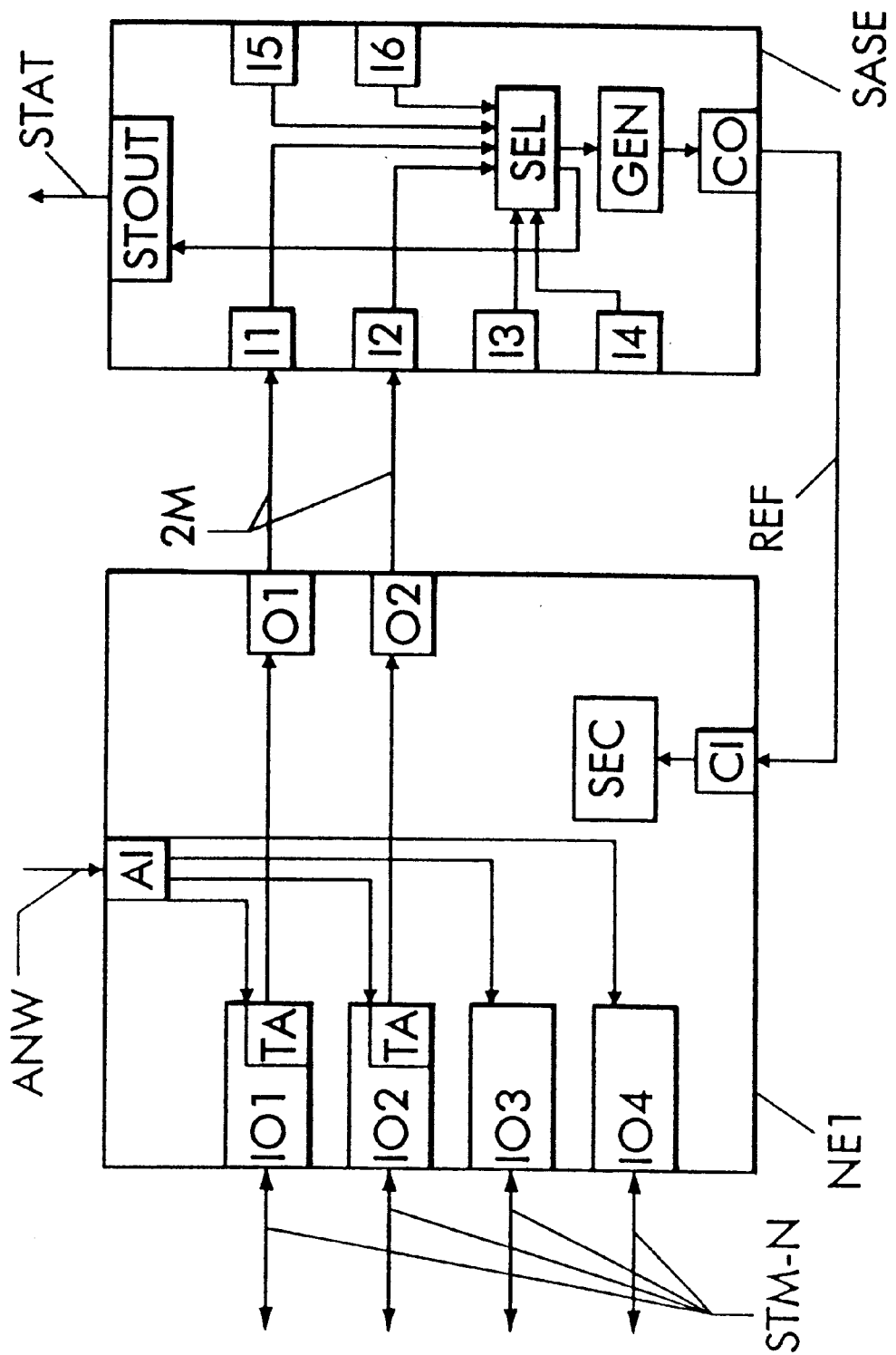
FIG. 3 is a network element which is connected to a central clock generator.
Figure 4:
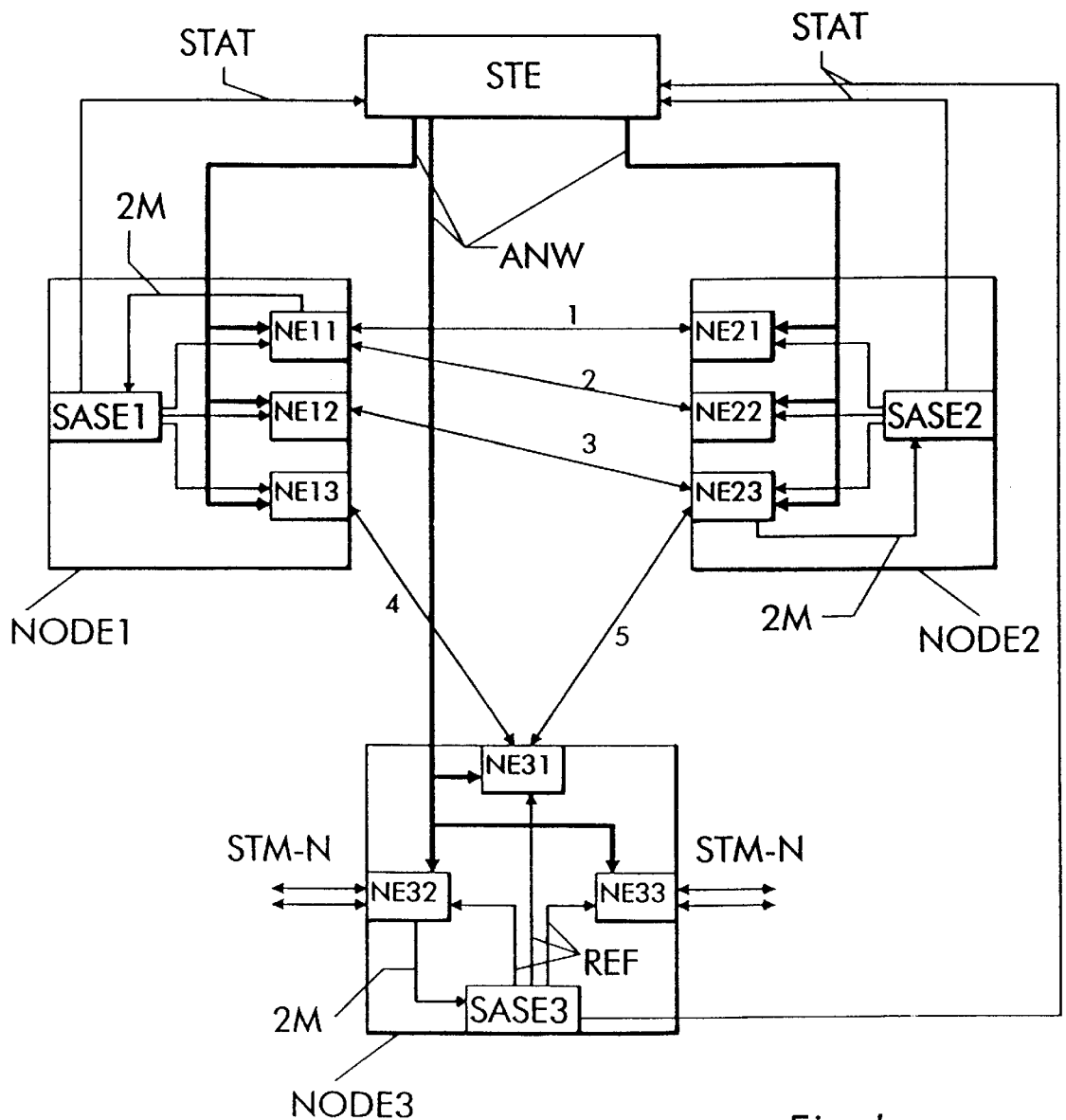
FIG. 4 is three network nodes and a central control installation.

FIG. 3. illustrates in detail one of the network elements NE1 and the central clock generator SASE from the first two embodiments. In this example the network element has four connector units IO1, ..., IO4 whereby message signals STM-N from other not illustrated network elements are received and transmitted. Each of two connector units IO1, IO2 is assigned a clock derivation circuit TA which derives a clock from the received message signals STM-N. In addition the two connector units IO1, IO2 read the SSM of the received message signal STM-N. A clock signal 2M which contains the SSM is generated from the derived clock. These clock signals 2M can be obtained from two clock signal outputs O1, O2.

The network element NE1 also has a reference clock input at which a reference clock REF is received from the central clock generator SASE. The reference clock REF is routed to a clock provider SEC of the network element NE1 in order to tune it to the reference clock REF. The network element NE1 can receive instructions ANW from a control installation via a further input AI. The instructions concern the SSM to be transmitted by the individual connector units with the message signals STM-N.

The central clock generator in the embodiment has six clock signal inputs I1, ..., I6 which receive clock signals 2M from network elements. In the illustrated example the two clock signal inputs I1, I2 are connected to the two clock signal outputs O1, O2 of the network element NE1. The remaining clock signal inputs can be connected to the clock signal outputs of other network elements of the node. The clock signal inputs I1, ..., I6 are connected to a selector unit SEL. It evaluates the SSM contained in the clock signals and uses the SSM to select the clock signal with the most accurate clock. If several clock signals have the same clock quality, either a specified ranking sequence can be used for the selection, so that the clock signal of a predetermined clock signal input with the same quality is preferably selected, or a random selection can be made.

A clock is derived from the selected clock signal and routed to a clock provider GEN of the central clock generator SASE in order to tune the latter. The clock provider GEN produces the reference clock REF for all the network elements of the node and is connected to the reference clock output CO from where the reference clock can be obtained. This reference clock output CO is connected to the reference clock input CI of the network element NE1.

A synchronous digital communications system of a third embodiment illustrated in FIG. 3 contains three interconnected network nodes NODE1, NODE2, NODE3 and a control installation STE. Each of the three network nodes is made up of three network elements NE11, ..., NE13, ..., NE31, ..., NE33 and a central clock generator SASE1, ..., SASE3. But the number of network elements in a network node is not limited to three. The network elements of a network node receive a reference clock REF from the central clock generator of the network node via reference clock lines. The central clock generator receives clock signals 2M from the network elements. Of the connections via which the central clock generators receive the clock signals, only those are shown which the respective central clock generator has selected for tuning its clock provider.

The central clock generators SASE1, ..., SASE3 are connected to the control installation STE and send it messages STAT about their synchronization status. On the basis of these messages the control installation sends instructions ANW to the individual network elements NE11, ..., NE13, ..., NE31, ..., NE33 regarding which SSM they are to transmit to their individual outputs. In the embodiment, the central clock generator SASE3 of the third network node NODE3 has selected a clock signal 2M from network element NE32 for synchronizing its clock provider. The clock contained therein comes from a not illustrated source to which the network element NE32 is connected via message connections STM-N, and has the accuracy established in the ITU-T recommendation G.811. The central clock generator SASE3 informs the control installation STE that it has selected the clock signal for the reference clock from network element NE32, and that this clock has the G.811 accuracy. The central control then gives instructions ANW to the network elements regarding which SSM they are to transmit to their outputs. Table 1 lists which SSM the network elements send to their outputs.

TABLE 1

SSM transmitted by the individual network elements to the different outputs.

| From: | To: | SSM |
| --- | --- | --- |
| NE11 | NE21 | DNU |
| NE21 | NE11 | G.811 |
| NE11 | NE22 | DNU |
| NE22 | NE11 | G.811 |
| NE12 | NE23 | DNU |
| NE23 | NE12 | G.811 |
| NE13 | NE31 | DNU |
| NE31 | NE13 | G.811 |
| NE31 | NE23 | G.811 |
| NE23 | NE31 | DNU |

The reference clock of the third network node NODE3 has the G.811 accuracy. The network elements NE31, ..., NE33 of the third network node therefore transmit the code G.811 with the SSM. The network element NE23 of the second network node receives a message signal with the stated clock quality from the network element NE31, derives a clock signal from it and routes it to the central clock generator SASE2 of the second network node. The latter selects the clock signal as the reference clock for the second network node NODE2 and distributes the clock to the connected network elements NE21, ..., NE23. The information for the control installation includes the message that the message signal used to synchronize the node comes from a predetermined input of the network element NE23, and that the accuracy of this clock is G.811. The control installation now informs the network element NE23 that it must transmit the SSM DNU (Do Not Use for synchronization) to the network element NE31, but transmit the SSM G.811 to the network element NE12. The network elements NE22 and NE21 are also instructed to transmit the SSM G.811.

The network element NE11 of the first network node NODE1 receives a respective message signal from network element NE21 and from network element NE22, that the SSM contains G.811. From each of these message signals it derives a clock signal for the central clock generator SASE1 of the first network node NODE1. The central clock generator SASE1 selects one of these clock signals and informs the control installation STE of the selection and the accuracy of the selected clock signal. The control installation STE instructs the network elements NE11 and NE12 to transmit the SSM DNU in the direction of the second network node. The network element NE13 must also transmit the SSM DNU to the network element NE31 of the third network node NODE3 so that no clock loop can take place, while the clock generator SASE3 of the third network node NODE3 selects a clock signal for tuning its clock provider, which contains the clock of the message signal received by the network element NE13.

The control installation STE determines the instructions ANW on the basis of the message STAT. To that end a memory in the control installation can contain predetermined tables which include the instructions for the individual network elements for every possible combination of messages from the connected central clock generator. Another possibility is for the central control to have information about the configuration of the connected network nodes, i.e. which connections exist between the network nodes, and which inputs of the central clock generator contain a clock signal that is derived from message signals received via these connections. By means of this information the central control can determine which SSM is to be transmitted by the individual network elements.

What is claimed is:

1. A network element (NE1) with a clock provider (SEC) which can be tuned to a reference clock (REF), a reference clock input (CI) that is connected to the clock provider (SEC) for receiving the reference clock (REF), and a number of connector units (IO1, ..., IO4) for receiving and sending message signals (STM-N), where a clock derivation circuit is assigned to at least a part of the connector units (IO1, IO2), for deriving a clock from the message signal (STM-N) received by the pertinent connector unit, characterized by clock signal outputs (O1, O2) respectively assigned to one of the connector units (IO1, IO2) with a clock derivation circuit (TA), for sending clock signals (2M) containing the clock of the message signal (STM-N) received by the pertinent connector unit, and a quality indicator which is indicative of the accuracy of this clock, and an input (AI) for receiving instructions (ANW), where the instructions (ANW) include quality indicators to be transmitted by the network element (NE1) to the individual connector units (IO1, ..., IO4).

2. A network element (NE1) as claimed in claim 1, characterized in that the clock signal outputs (O1, O2) are a 2MBit interface, that the reference clock input (CI) is a 2 MHz interface, and that the input (AI) for receiving instructions (ANW) is a Q-interface.

3. A central clock generator (SASE; SASE1, ..., SASE3) for a network node (NODE; NODE1, ..., NODE3) of a synchronous digital communications system, with a clock provider (GEN) which can be tuned to an external clock, and a reference clock output (CO) from which a reference clock (REF) can be obtained for network elements (NE1, ..., NE6; NE11, ..., NE13, NE21, ..., NE33) of the network node, characterized by a number of clock signal inputs (I1, ..., I6) for receiving clock signals (2M) each of which contains a clock and a quality indicator indicative of the accuracy of the clock, a selector unit for selecting the external clock for tuning the clock provider (GEN) by means of the quality indicators, an output for sending a message (STAT) about the synchronization status of the central clock generator (SASE) to a control installation (STE).

4. A central clock generator as claimed in claim 3, characterized in that the clock signal inputs are 2MBit interfaces, and that the output for transmitting a message (STAT) is an X.25 interface.

* * * * *